US008549313B2

(12) United States Patent
Seguin et al.

(10) Patent No.: US 8,549,313 B2
(45) Date of Patent: *Oct. 1, 2013

(54) METHOD AND SYSTEM FOR INTEGRATED SECURING AND MANAGING OF VIRTUAL MACHINES AND VIRTUAL APPLIANCES

(75) Inventors: Jean-Marc L. Seguin, Stittsville (CA); Jay M. Litkey, Stittsville (CA); David M. Lynch, Gatineau (CA); Mark Jamensky, Nepean (CA)

(73) Assignee: Embotics Corporation, Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/459,129

(22) Filed: Apr. 28, 2012

(65) Prior Publication Data

US 2012/0216045 A1    Aug. 23, 2012

Related U.S. Application Data

(63) Continuation of application No. 12/247,210, filed on Oct. 7, 2008, now Pat. No. 8,171,301.

(60) Provisional application No. 60/978,121, filed on Oct. 7, 2007.

(51) Int. Cl.
*G06F 21/00*    (2006.01)
(52) U.S. Cl.
USPC ........................................................ 713/182
(58) Field of Classification Search
None
See application file for complete search history.

(56) References Cited

U.S. PATENT DOCUMENTS

2006/0212477 A1*   9/2006   Murphy et al. ............ 707/104.1
2008/0141336 A1*   6/2008   Haller .............................. 726/1

OTHER PUBLICATIONS

"Digital Signature", an article from Wikipediea, the free encyclopedia published at http://en.wikipedia.org/wiki/Digital_signature, Sep. 2007.
"Digital Certificate", a definition provided by Information Security Magazine at http://searchsecurity.techtarget.com, Jul. 10, 2006.
"SHA hash functions", an article from Wikipediea, the free encyclopedia published at http://en.wikipedia.org/wiki/SHA_hash_functions, Sep. 2007.
"MD5" an article from Wikipediea, the free encyclopedia published at http://wikipedia.org/wiki/Md5, Sep. 2007.
"Digital certificates for signing objects", an article from IBM iSeries Information Center, version 5, Release 3, published at https://publib.boulder.ibm.com/infocenter/series/v5r3/index.jsp?topic=/rzahu/rzahurzahusignsigningobjects.htm, Sep. 2007.
"Certificate: Java Glossary" by Roedy Green, published at http://mindprod.com/jgloss/certificate.html, Jul. 30, 2008.
"Types of digital certificates", an article from IBM iSeries Information Center, version 5, Release 3, published at https://publib.boulder.ibm.com/infocenter/series/v5r3/index.jsp?topic=/rzahu/rzahutypesofcerts.htm, Sep. 2007.

* cited by examiner

*Primary Examiner* — Brandon Hoffman
(74) *Attorney, Agent, or Firm* — Victoria Donnelly; IP-MEX Inc.

(57) ABSTRACT

Method and system for the integrated securing and managing of virtual machines and virtual appliances are presented. Sealing the virtual appliance at the computer of a sender, verifying authenticity of the sender at a recipient computer and managing the execution of the VA are performed in a seamless fashion.

20 Claims, 14 Drawing Sheets

METHOD AND SYSTEM FOR INTEGRATED SECURING AND MANAGING OF VIRTUAL MACHINES AND VIRTUAL APPLIANCES

RELATED APPLICATIONS

The present patent application is a Continuation of U.S. patent application Ser. No. 12/247,210 filed on Oct. 7, 2008, which has now issued into a U.S. Pat. No. 8,171,301 on May 1, 2012, which claims priority from the U.S. provisional application Ser. No. 60/978,121 to Jean-Marc SEGUIN entitled "A Method And System For Managing And Securing Virtual Machines And Virtual Appliances" filed on Oct. 7, 2007, entire contents of which are incorporated herein by reference.

FIELD OF THE INVENTION

The invention relates to virtual machines (VMs) and virtual appliances (VAs), and in particular, to a method and system for the integrated securing and managing of VMs and VAs, including tracking and controlling the VMs and VAs.

BACKGROUND OF THE INVENTION

Virtualization of computing systems has become quite prevalent in recent times. This refers to a new layer that abstracts the hardware platform from the operating system (OS), and the associated applications that run on it. This virtualization technique allows the hardware platform to support the concurrent running of more than one operating system and their associated applications held in containers called virtual machines, controlled and scheduled by a virtual machine monitor (VMM). This has offered a way for computer operators to consolidate, optimize and increase efficiencies of computing platforms as well as simplifying application deployment.

Some computer operators, including software vendors, who are interested in simplifying the delivery, control, supportability, security and the tuning of their applications to work in a virtualized environment have created a purpose-built VM containing a preferred Operating System (OS) and their application(s), and configured the virtual machine to the most optimal settings for their needs. At the same time they can choose to restrict how their application(s) and OS are accessed by disabling specific ports and OS utilities, even disabling command line login. This type of virtual machine has been named a virtual appliance.

As a result, virtual appliances are becoming widespread on the Internet, and many of them are available for little or no cost. They can be downloaded quite quickly, installed and started up on a virtualization platform with ease.

For the purposes of clarity, in the remainder of the document the terms VM and VA will be used interchangeably and will mean either a VM or a VA.

As VMs become more prevalent, numerous issues arise, ranging from security to management of VMs. A non-exhaustive list of issues includes assuring the authenticity of the VM, assuring the VM comes from a known source, et al.

Certain of these issues have been solved in the software industry for other types of objects. Web servers, especially for online banking or e-commerce, have been exchanging digital certificates to secure communications. These digital certificates allow the user to know that he/she is communicating with the correct entity. Digital certificates are controlled by a central authority and are given out only when sufficient proof has been provided by the potential digital certificate owner.

The digital certificates also provide access to a "public key", which is one of two keys used in asymmetric cryptography to secure communications. The private key is held by the web server (the online banking institution or e-commerce site). This is an oversimplification of the technology, but each side uses its half of the key to encrypt outgoing information and decrypt incoming data ensuring a secure session.

Similar technology concept was applied to software code. The vendor obtains a digital certificate from a recognized certificate authority and creates a hash of its code, e.g., by using cryptographic hashing algorithms such as Message-Digest Algorithm 5 (MD5), or Secure Hash Algorithms (SHA). This hash is sensitive to even one bit change within code, thereby guaranteeing the integrity of the code. The vendor then uses its private key to sign the code by encrypting the hash and embedding this signature into the code package. This signature not only allowed the customer/end-user to verify that this code came from the source it was supposed to, but allows them to retrieve the embedded hash and compare it against the hash calculation they do themselves over the code to see if they match. If not, the package is diagnosed to have been compromised.

In spite of existing software solutions, there is an existing need in the industry for the development of an improved and effective method and system for managing and securing VMs, including tracking and controlling of VMs.

SUMMARY OF THE INVENTION

Accordingly, there is an object of the present invention to provide a method and system for achieving a secure and manageable virtualization environment capable of supporting secure virtual machines and, in turn, secure virtual appliances.

According to one aspect of the invention, there is provided a method for the integrated securing and managing a virtual appliance (VA), comprising an operating system and software applications, the method comprising the steps of: (a1) sealing the VA at a sender computer, including attaching to the VA a signature of a sender and policies governing usage of the VA to generate a sealed VA; (b1) verifying authenticity of the sender upon receiving the sealed VA at a recipient computer; and (c1) managing execution of the VA on the recipient computer in accordance with the policies; whereby preserving the integrity of the VA and protecting the VA from unauthorized use.

The method further comprises the step of attaching a Delta file to the VA, the Delta file including changes made to the VA on the sender computer, the step being performed before the step (a1). The step (a1) further comprises: (a3) creating a signature uniquely identifying the sender; (b3) creating policies for managing ownership of the VA; (c3) creating policies for managing operations performed by the VA; and (d3) producing the sealed VA by attaching the signature and the policies generated in the steps (b3) and (c3) to the VA, and delivering the sealed VA to a recipient to be received at the recipient computer.

The step (a3) further comprises: (a4) using cryptographic keys, comprising a private key and a public key, at both the sender and the recipient; (b4) determining a hash of contents of a file containing the VA; and (c4) encrypting the hash with the private key of the recipient. The method further comprises the step of encrypting the sealed VA for providing further security. The step of encrypting further comprises: (a6) using a one-time symmetric key for performing symmetric cryptography in securing the sealed VA; (b6) encrypting the sealed VA with the one-time symmetric key; and (c6) encrypting the one-time symmetric key with the public key of the recipient.

The step (b1) further comprises: (a7) verifying the signature uniquely identifying the sender by using the public key of the sender; (b7) retrieving the hash generated in the step (b4); (c7) determining a hash of contents of the file containing the VA at the recipient computer; and (d7) comparing the hash determined in the step (c7) with the hash retrieved in step (b7) for verifying an identity of the sender. The method further comprising the following steps, the steps being performed before the step (a7): (a8) decrypting the one-time symmetric key with the private key of the recipient; and (b8) decrypting the sealed VA using the one-time symmetric key obtained in step (a8).

Step (c1) further comprises: (a9) loading the VA at the recipient computer; and (b9) using the VA in accordance with the policies created in the steps (b3) and (c3). The method further comprises the step of applying the changes in the Delta file to the VA, the step being performed after the step (a9). Step (a9) further comprises: (a11) verifying accessibility of files containing the operating system and the software applications; (b11) loading contents of the files on the recipient computer; and (c11) creating a new Delta file for recording changes made to the VA on the recipient computer.

Step (b9) further comprises: (a12) executing the software applications in the VA in one of the following modes: (a12-i) read-only mode when no changes are allowed to be made to the VA on the recipient computer; or (a12ii) read and write mode when changes are allowed to be made to the VA on the recipient computer; (b12) recording changes made in the new Delta file during the executing of the step (a12); (c12) generating a signature of the recipient; (d12) saving the VA; and (e12) sealing the VA at the recipient computer including attaching the signature, the policies and the new Delta file to the VA.

According to another aspect of the invention, there is provided a system for securing a virtual appliance (VA), comprising an operating system and software applications, the system comprising a processor and a computer readable storage medium, storing computer executable instructions to be executed by the processor, to form the following modules: (a13) a sealing module, attaching to the VA a signature of a sender and policies, governing usage of the VA, to generate a sealed VA at a sender computer; (b13) a security enforcement module, verifying authenticity of the sender upon receiving the sealed VA at a recipient computer; (c13) an execution management module, managing execution of the VA on the recipient computer in accordance with the policies; and (d13) metadata module, including metadata, comprising resource requirement data and runtime data for the VA.

The system further comprises a first Delta file handler module, recording changes made to the VA on the sender computer and generating a Delta file, including said changes. The sealing module (a13) further comprises: (a15) a security provisioning module, creating a signature uniquely identifying the sender; (b15) a policy generation module, creating policies for managing ownership of the VA; and (c15) a delivery module, producing the sealed VA, including attaching the signature and the policies to the VA, and delivering the sealed VA to a recipient.

The security provisioning module (a15) further comprises: (a16) a hash generation module, creating a hash of contents of a file containing the VA; and (b16) a signature generation module, encrypting the hash with a private key of the recipient.

The signature generation module (b16) further comprises a symmetric encryption module, encrypting the sealed VA with a one-time symmetric key, and encrypting the one-time symmetric key with the public key of the recipient, thereby providing further security.

The security enforcement module (b13) further comprises: (a18) a signature verification module, verifying the signature; and (b18) a hash verification module, determining a hash of contents of the file containing the VA at the recipient computer and comparing with the hash generated by the hash generation module (a16). The signature verification module further comprises a symmetric decryption module, decrypting the sealed VA generated by the symmetric encryption module. The execution management module (c13) further comprises a policy enforcement module, using the VA in accordance with the policies.

The execution management module further comprises a second Delta file handler module, recording changes made to the VA on the recipient computer and generating a new Delta file, including said changes. The policy enforcement module further comprises a rules engine, processing rules describing policies for managing ownership of the VA and policies for managing operations performed by the VA using the metadata of the step (d13).

A computer readable medium is also provided, having a computer readable program code means stored thereon, when executed by a computer, to perform the steps of the method as described above.

BRIEF DESCRIPTION OF THE DRAWINGS

Further features and advantages of the invention will be apparent from the following description of the embodiments of the present invention, which are described by way of example only and with reference to the accompanying drawings in which.

DETAILED DESCRIPTION OF THE EMBODIMENTS OF THE INVENTION

Figure 1:
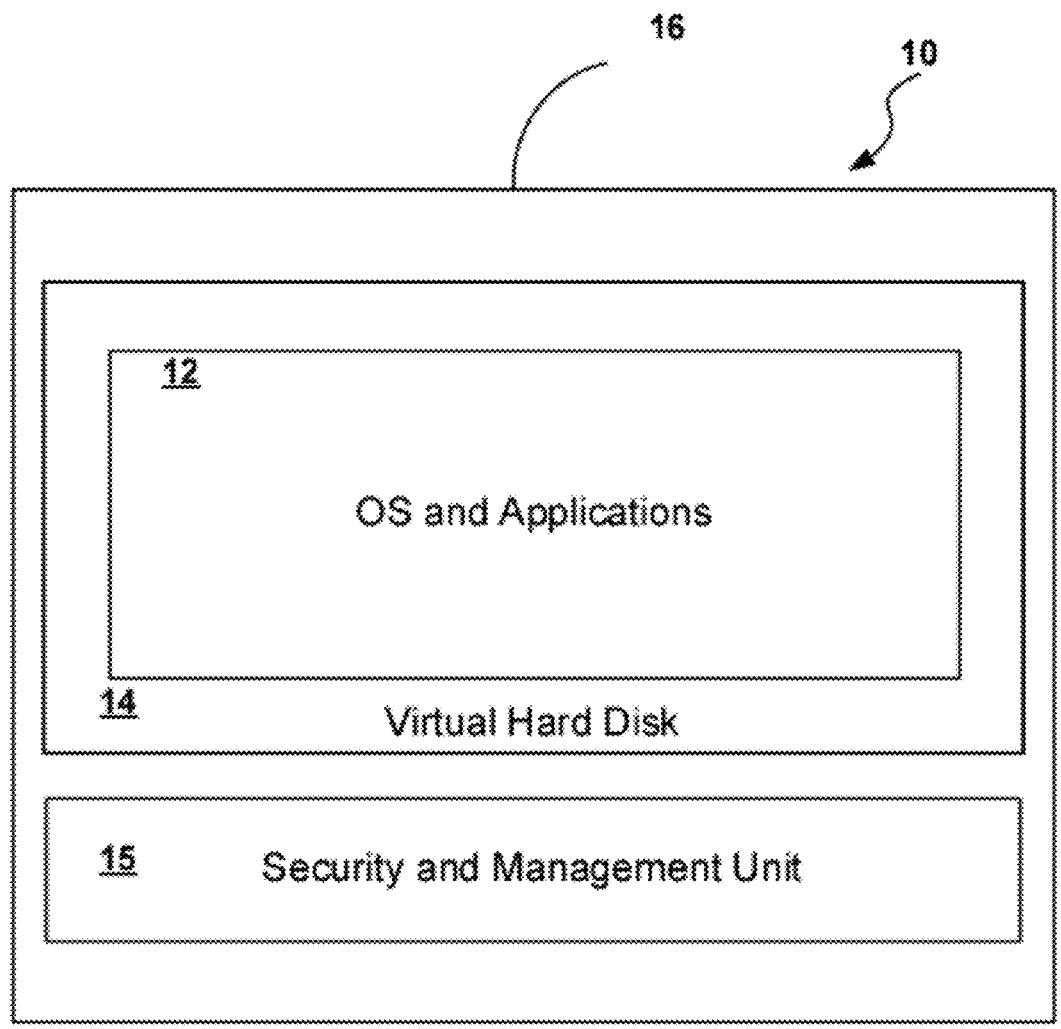
FIG. 1(a) schematically illustrates a secured VA of the embodiment of the present invention, which is securely wrapped in a software container comprising security and policy modules.
FIG. 1(b) schematically illustrates the secured VA of FIG. 1(a), which is further securely wrapped with a Delta file stored externally and applied at runtime.

FIG. 1(a) illustrates a secured virtual machine 10, or a VA, of the embodiment of the present invention, comprising a virtual hard disk 14 containing the Operating System (OS) and Applications 12 associated with the VA, and including other Virtual Machine Disk (VMDK) format or Virtual Hard Disk (VHD) format information, wrapped in a software container 16 along with a Security and Management unit 15. The Security and Management unit 15 performs the steps of the method of the embodiment of the present invention, and ensures security and integrity of the VA 10 as it is delivered from a sending computer by a sender to a recipient who executes the VA 10 on a recipient computer. The steps of securing a VA and managing its execution are combined in a seamless way.

The Security and Management unit 15 generates a sealed VA 10. It ensures that the VA 10 is "signed" by the sender or vendor using a certificate from a recognized Certificate Authority, so that each recipient of the VA 10 (customer/end-user) that uses this package knows that it has retrieved the package from a trusted reputable source and that the package has not been compromised. The Security and Management unit 15 also provides rights Management for the VA 10 as will be described in detail later in this document.

Figure 1B:
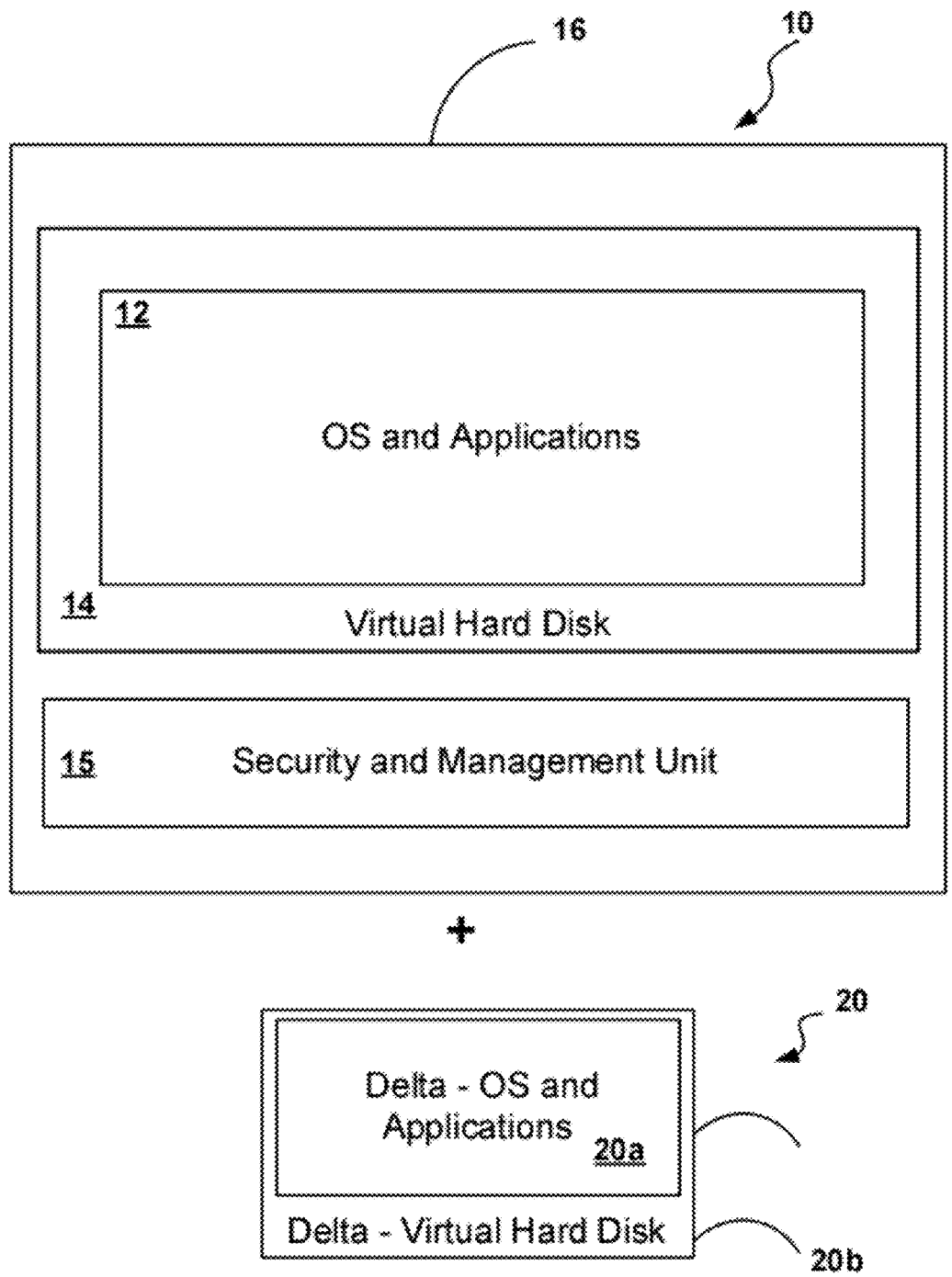

A virtual appliance is dynamic by nature. Each time the VA 10 is opened/run, the VA 10 may be modified by the operating system and the applications 12 within them. To protect the original VA, an additional technology, providing the ability to record these changes in a Delta file 20, has been used in the embodiment of the present invention. It is schematically illustrated in FIG. 1(b), where the Delta file 20 has been created, comprising of a Delta—OS and Applications file 20a for the OS that is contained within Delta-virtual hard disk 20b corresponding to the VA. The Delta file 20 is a file that contains only the differences between the original VA 10 and the current running state of the VA 10 within virtualization. Each time the VA 10 is started, the virtualization system loads the original VA 10 disk image, and then applies the Delta files 20 one after another in a progression based on dependencies until the complete image is loaded and then the OS and the application may start to run. There can be one or many Delta files 20 secured and stored with a VA. Only one Delta file 20, the content of which is updated with corresponding changes, is shown in FIG. 1(b) for simplicity. It is understood that multiple Delta files 20 may be created in association with the VM or VA, when the VA 10 is opened and used in succession by multiple recipients.

The use of Delta files 20 ensures that the original VA 10 is not tampered with, its signature always intact, and that changes can always be rolled back all the way to the beginning, if required. Each and every Delta file 20 inherits security and policy characteristics from the main VA 10, but can have its own security module and policy module attached.

As mentioned earlier, it is important to control the rights associated with a VA. Just as it is imperative that the customer/end-user knows and trusts where the VA 10 came from and that the integrity of the VA 10 is intact, it is equally important for the vendor/creator to know that the VA 10 is not being used outside of its license agreements.

Today a VA 10 can be downloaded and then quickly duplicated over and over and run on many machines requiring the VA 10 to be heavily laden with license managers and other techniques to control its use. Virtualization, however, allows customers/end-users to avoid traditional control mechanisms.

Most license managers currently lock themselves to a specific key created by a few pieces of identification it takes from a physical platform. As the physical platform is now being simulated, license managers can be tricked through virtualization into believing they are always on the one platform that they are keyed for, which defeats the entire purpose of rights management.

Accordingly, a new way to ensure rights management is required. The solution is provided by the Security and Management unit 15 of the embodiment of the present invention, which is associated with the VA 10 and wrapped in the software container 16 as illustrated in FIGS. 1(a) and 1(b) above. This unit is used at a sending computer used by the sender to seal the VA 10, thereby describing and providing security and integrity for the VA 10, and at a recipient computer used by a recipient of the sealed VA for verifying authenticity of the sender, enforcing the security of a VA 10 and for managing the execution of the VA 10 at the recipient computer. The sealed VA 10 includes a signature of the sender, policies governing the usage of the VA 10 by the recipient and, potentially, one or many Delta file(s) 20 including the changes made to the original VA 10 if this has passed through a middleman. Both the sender and the recipient have keys including a private key and a public key that are used in the encryption of information associated with the VA.

A system 300 for securing and managing a virtual appliance (VA) of the embodiment of the invention will be described with regard to FIGS. 2 and 3 below. The system includes a general purpose or specialized computer having a CPU and a computer readable medium, e.g., memory. Alternatively, the system can be implemented in firmware, or combination of firmware and a specialized computer.

Figure 2:
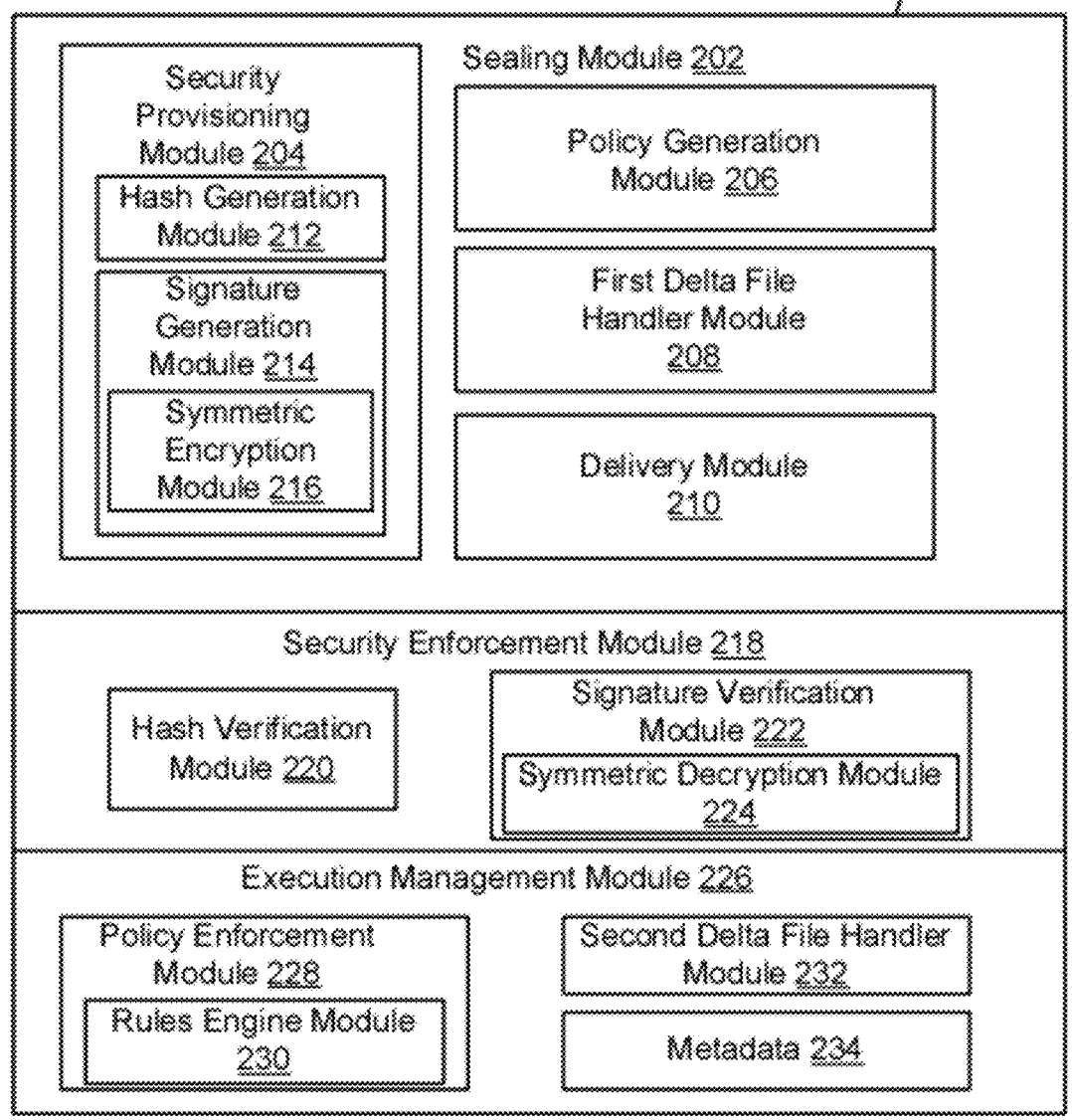
FIG. 2 shows the functional components of the security and management unit of FIGS. 1(a) and 1(b)

Various modules of the Security and Management unit 15 are discussed with the help of FIG. 2. Please note that the Sealing module 202, the Security Provisioning module 204, the Hash Generation module 212, the Signature Generation module 214, the Symmetric Encryption module 216, the Policy Generation module 206, the First Delta Handler module 208, the Delivery Module 210, the Security Enforcement module 218, the Hash verification module 220, the Signature Verification module 222, the Symmetric Decryption module 224, the Execution Management module 226, the Policy Enforcement module 228, the Second Delta file handler module 232, the Rules engine module 230 include units comprising a firmware or alternatively a computer software code stored in a computer readable medium, comprising computer memory, DVD, CD-ROM, floppy or the like.

A brief description of each module is provided below.

The Sealing module 202 is used by the sender for sealing the VA 10 at the sending computer. It includes the following modules.

Security Provisioning module 204 provides security related services. This module in turn includes a Hash Generation module 212 for determining a hash of the contents of the file containing the VA 10 and a Signature Generation module that generates the signature for uniquely identifying the sender. The Signature Generation module 216 optionally includes a Symmetric Encryption module 216 that is used for performing symmetric cryptography when further security is used by the sender.

Policy Generation module 206 generates the policies for ownership management for the and for the management of operations performed by the VA 10 when the VA 10 executes on the recipient computer. Ownership management policies are provided as part of signing the VA 10 and address issues that include the following.
1. Ownership: Is this VA 10 locked to a specific enterprise, user, system, timeframe, etc?
2. License: How many concurrent copies of a VA 10 can be run at the same time?
3. Transfer of ownership: Can this VA 10 be given to others to use? and
4. Uniqueness: Can this VA 10 be duplicated?

Policies for management of the operations of the VA 10 address issues that include the following.
1. Automatically issue new licenses;
2. Deny access to shared folders outside of the VA;
3. Deny the ability to use clipboard techniques to copy information into or out of the VA; and
4. Deny console or KVM (keyboard-video-mouse) access to the VA.

Policies embedded directly in the VA 10 will ensure that the policies are also signed and controlled, and the integrity of said policies is ensured.

First Delta File Handler module 208 is used to apply the changes recorded in the Delta file to the VA 10 before it starts executing on the recipient computer.

Delivery module 210: is used for producing a sealed VA 10 by attaching the signature and the policies to the VA 10 and delivering the sealed VA 10 to the recipient. Please note that the Delta files 20 are also included in the sealed VA that is delivered to the recipient.

Security Enforcement module 218 is used for verifying authenticity of the sender upon receiving the sealed VA 10 at a recipient computer. This module includes a Hash Verification module 220 and a Signature Verification module 222 that are used to verify the signature of the sender at the recipient computer. The Signature Verification module 222 includes a Symmetric Decryption module 224 that is used when symmetric encryption is used at the sending computer for providing additional security.

Execution Management module 226 is used at the recipient computer to manage the execution of the VA 10. This module includes a Policy Enforcement module 228 that is used for ensuring that the VA 10 is executed on the recipient computer in accordance with the polices included with the VA 10 and a Second Delta file handler module 232 that is used for recording changes made to the VA 10 during execution on the recipient computer on to a new Delta file 20. The Policy Enforcement module 228 may include a Rules engine module 230 that can process rules underlying policies. Rules can also be self executing and bypass the main portion of the Rules Engine module 230.

Metadata module 234 contains metadata that is used by the various modules of the Security and Management unit 15 for providing the desired functionality. Metadata includes instance data such as resource needs of the VA 10 and runtime data monitoring execution of the VA to discover excessive CPU usage, for example. Metadata is typically stored on a computer readable medium, for example, random access memory.

Figure 3:
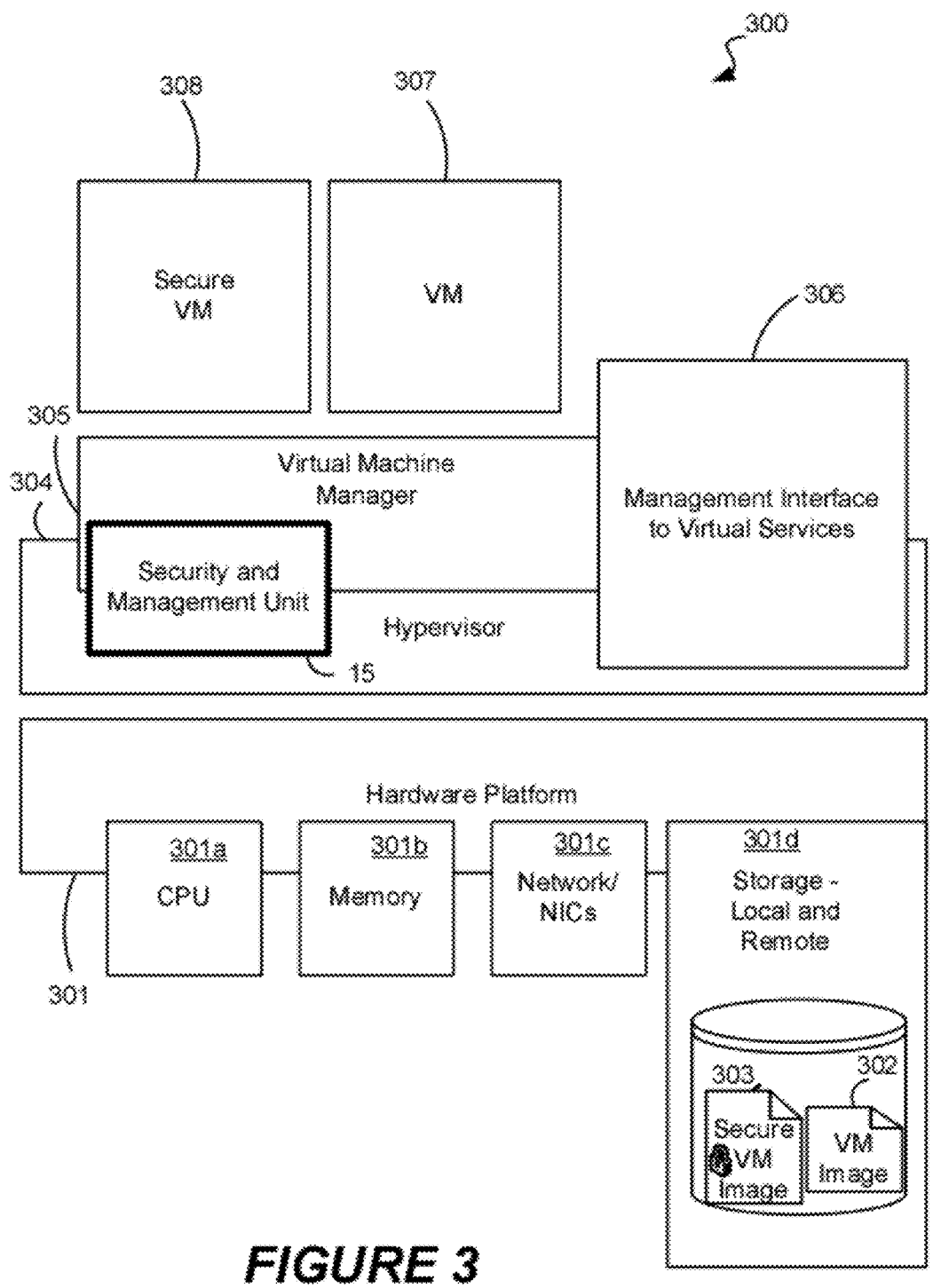
FIG. 3 schematically shows a computer system for securing and managing virtual machines, including the security and management unit of FIG. 2.

The computer system 300, comprising a VA 10 of FIG. 1(a) that has been secured with the help of the Security and Management unit, is described in more detail with the help of FIG. 3. The computer system 300 includes a hypervisor 304 or a virtualization aware operating system that is responsible for abstracting the components of the physical hardware platform 301. These physical components include CPUs 301a, Memory 301b, Network Interfaces 301c and Storage 301d. Within the Storage component 301d, the image of the VMs (only one VM image 302 being shown for simplicity) exist as a series of files. Please note that the secure VM image 303 is the image obtained after sealing the VM image 302.

The Virtual Machine Manager (VMM) 305, on command to start a virtual machine from the virtual machine image 302 received from the Management Interface to Virtual Services 306, retrieves the files for the chosen VM image 302 from storage through the hypervisor 304, loads it and starts to run the code within as if the VM 302 was running an OS on the hard drive of a physical hardware platform. The OS within the VM accesses the virtual CPU, Memory, NIC and Storage provided by the hypervisor 304 as if it was a physical box.

As briefly described earlier, to allow the computer system 300 to handle secure VMs as well as enforce policy, the Security and Management unit 15 has been implemented.

While authenticating the sealed VA 10, the Security and Management Unit 15 returns an "authorized r/o (read-only)" or "authorized r/w (read and write)" message.

Figure 4:
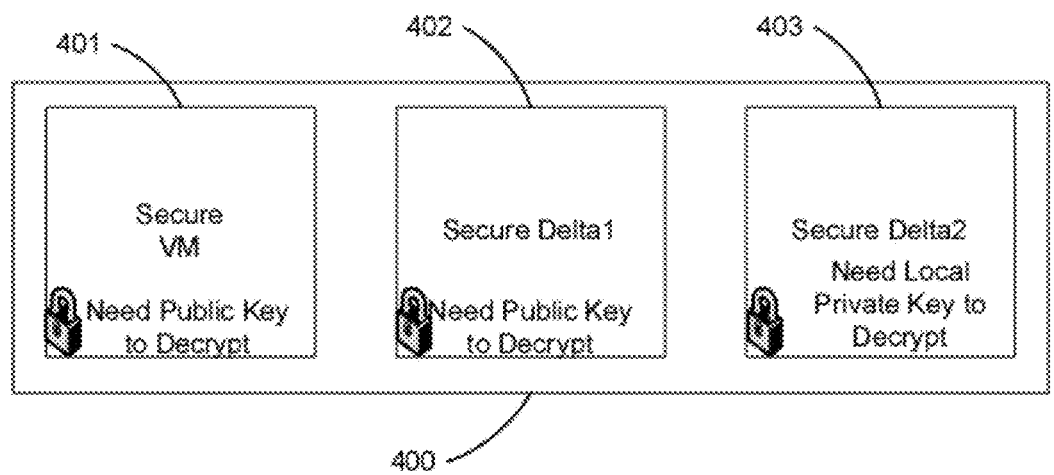
FIG. 4 illustrates a secure VA with its corresponding Delta files.

A more detailed description of the method is provided later in this document. The difference between each message has to do with the signature on the secure VM image 303. If a public key is needed/used to decrypt the VM (303), then the VM image (303) is put into a read-only state. A public key will be needed if the secure VM 303 came from an external source, i.e. this VMM was not the system that created this VM—it has been signed with a public key of a third party. If a private key is used, it most likely means that the VM image 303 was created by the VMM 305 and therefore is alterable. This process is schematically illustrated in FIG. 4. In order to protect the integrity of the original VA 10, Delta files 20 are used to record changes made during a VM's execution. The example in FIG. 4 shows a Secure VM 401 and two secure Delta files: Delta1, 402 and Delta2, 403 contained in a Sealed VM 400. Delta1 402 is due to changes made to Secure VM 401 by a previous user when it was the sole component of Sealed VM 400. Together they were passed on to the company currently using the virtual machine and thus a public key for the previous user is necessary for decryption. Delta2 403 is due to an employee in the current company, so the private key for the current user, device or company is to be used for decryption.

The first few steps of the method of the embodiment of the invention are executed at the sending computer for clarity and the rest of the steps are executed on a recipient computer although they can be all run at the same site. The steps of the method of the invention executed at the sending computer are explained with the help of the flowchart 500 illustrated in FIG. 5(a). Upon start (box 502), procedure 500 performs the sealing operation for the VA 10 (box 504). The sealed VA 10 is then delivered to the recipient (box 506) and the procedure 500 exits (box 516).

Figure 5A:
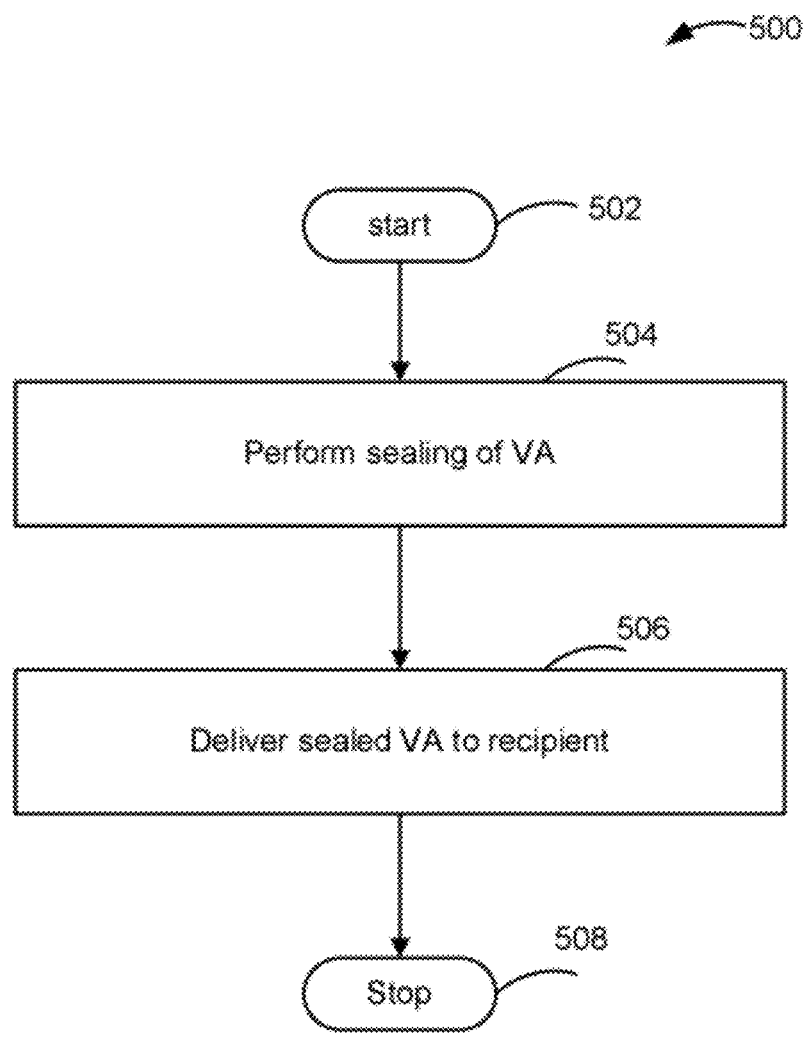
FIG. 5(a) shows a flowchart illustrating the steps of the method for managing and securing virtual appliances executed at a sending computer.
Figure 5B:
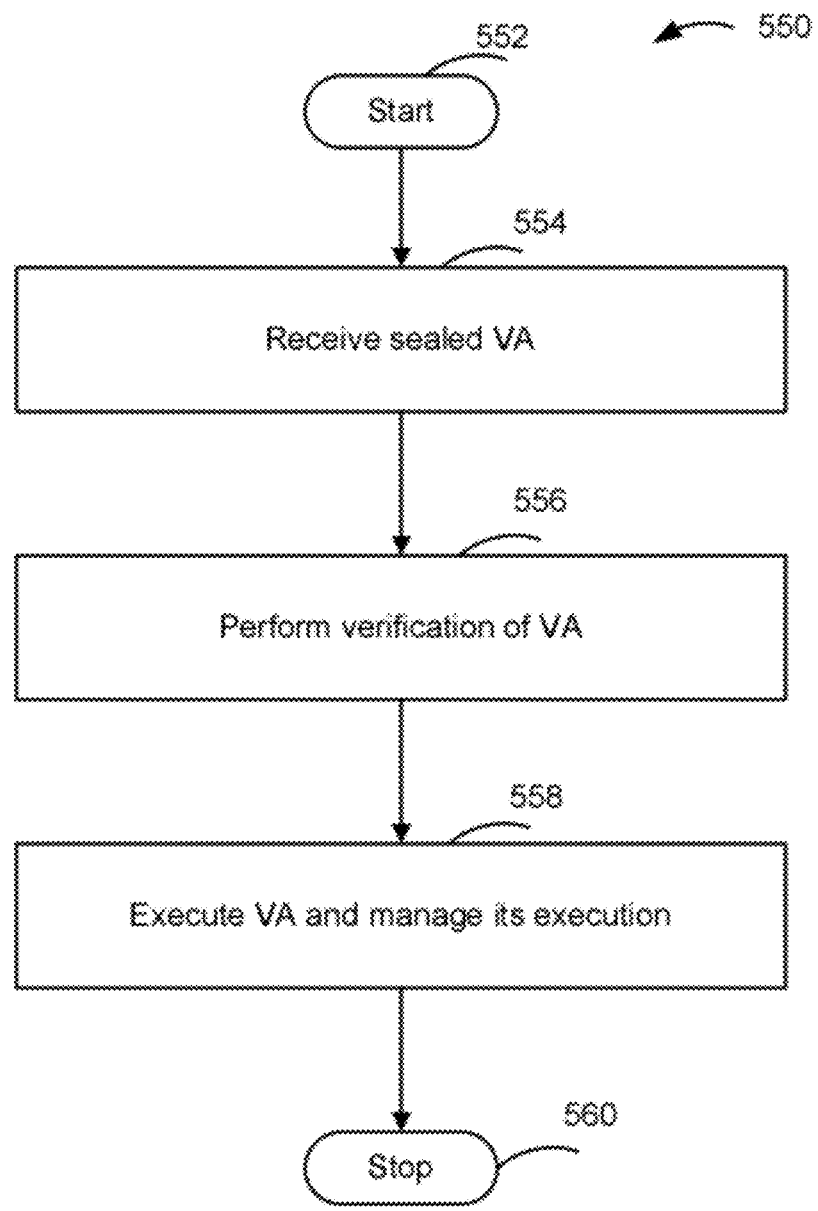
FIG. 5(b) shows a flowchart illustrating the steps of the method for managing and securing virtual appliances executed at a recipient computer.

The steps of the method of the invention executed at the recipient computer are explained with the help of the flowchart 550 illustrated in FIG. 5(b). Upon start (box 552), the sealed VA 10 delivered from the sending computer is received at the recipient computer (box 554). The procedure 550 performs verification of the VA (box 556) next. After the authenticity and the integrity of the VA are verified, the procedure 550 proceeds to execute the VA and manage its execution (box 558) and exits (box 560).

Figure 6:
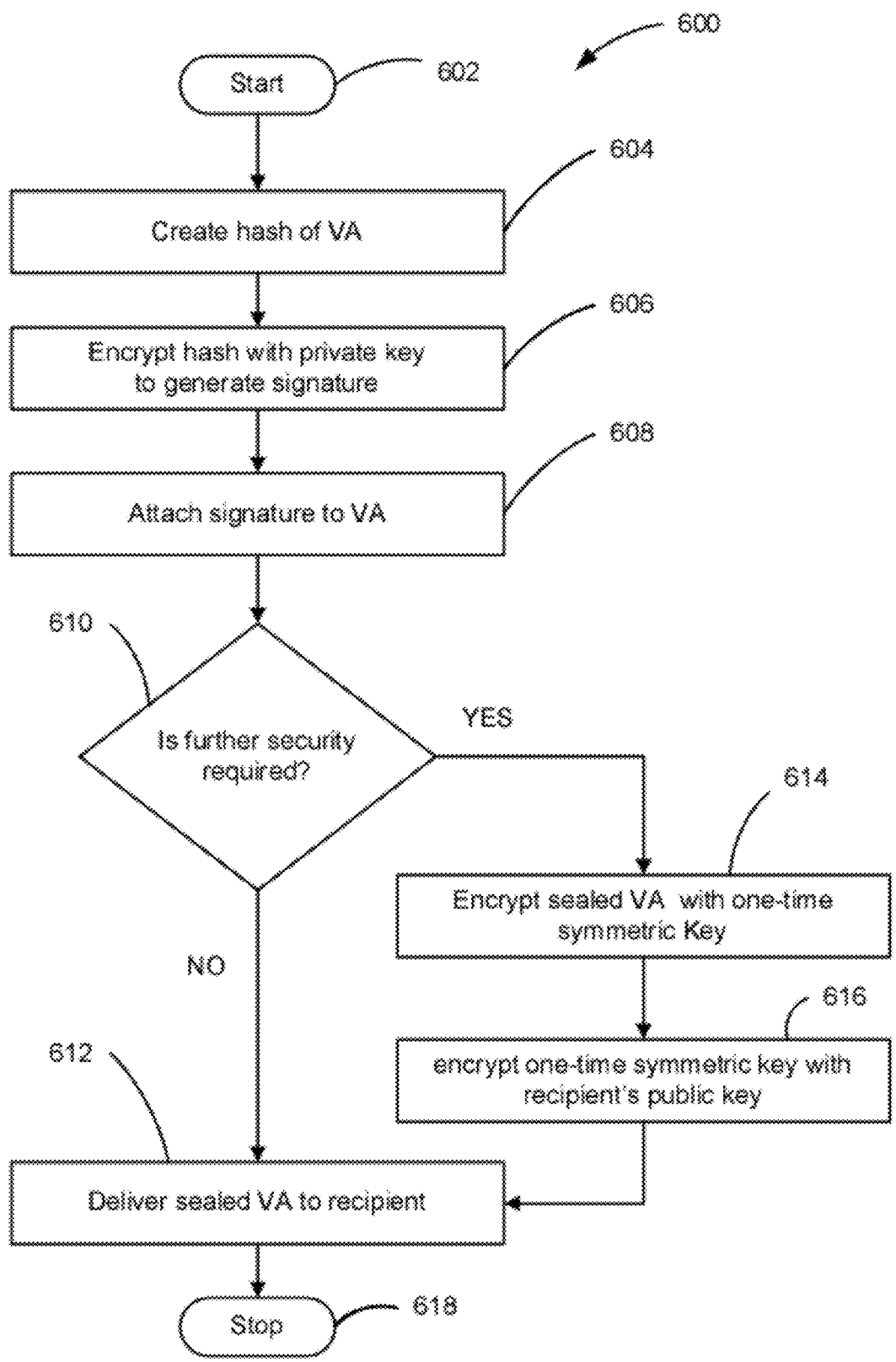
FIG. 6 shows a flowchart illustrating the step 504 "Perform Sealing of VA" of FIG. 5(a)

The step "Perform sealing of VA" (box 504) of procedure 500 presented in FIG. 5(a) is explained further with the help of flowchart 600 displayed in FIG. 6. Such an operation is typically performed, when a vendor has completed its virtual appliance, and plans to sell it into the trusted market. Before the steps of the method 600 displayed in FIG. 6 are executed, the vendor acquires a digital certificate from a trusted certificate authority (CA) that verifies the vendor's identity. Upon Start (box 602), the Vendor creates a hash of the contents of the file containing the newly created VA 10 that is stored in a VMDK file for example (box 604). Then the vendor uses its private key to generate a signature for the VA 10 (box 606). This is achieved by encrypting the hash. The "signature" is then attached to the hash of the VA 10 (box 608). Whether or not more security is required is checked next (box 610). If no further security is required the procedure 600 exits 'NO' from box 610, delivers the VA 10 to the recipient (box 612) and exits (box 618). If further security is required, the procedure 600 exits 'YES' from box 610. At this point another level of security is added by encrypting the entire VA 10 with a one-time symmetric key (box 614) and then the symmetric key is encrypted with the recipient's public key ensuring that only the recipient can open the VA 10 (616). Next, the procedure 600 delivers the VA 10 to the recipient (box 612) and exits (box 618).

Figure 7:
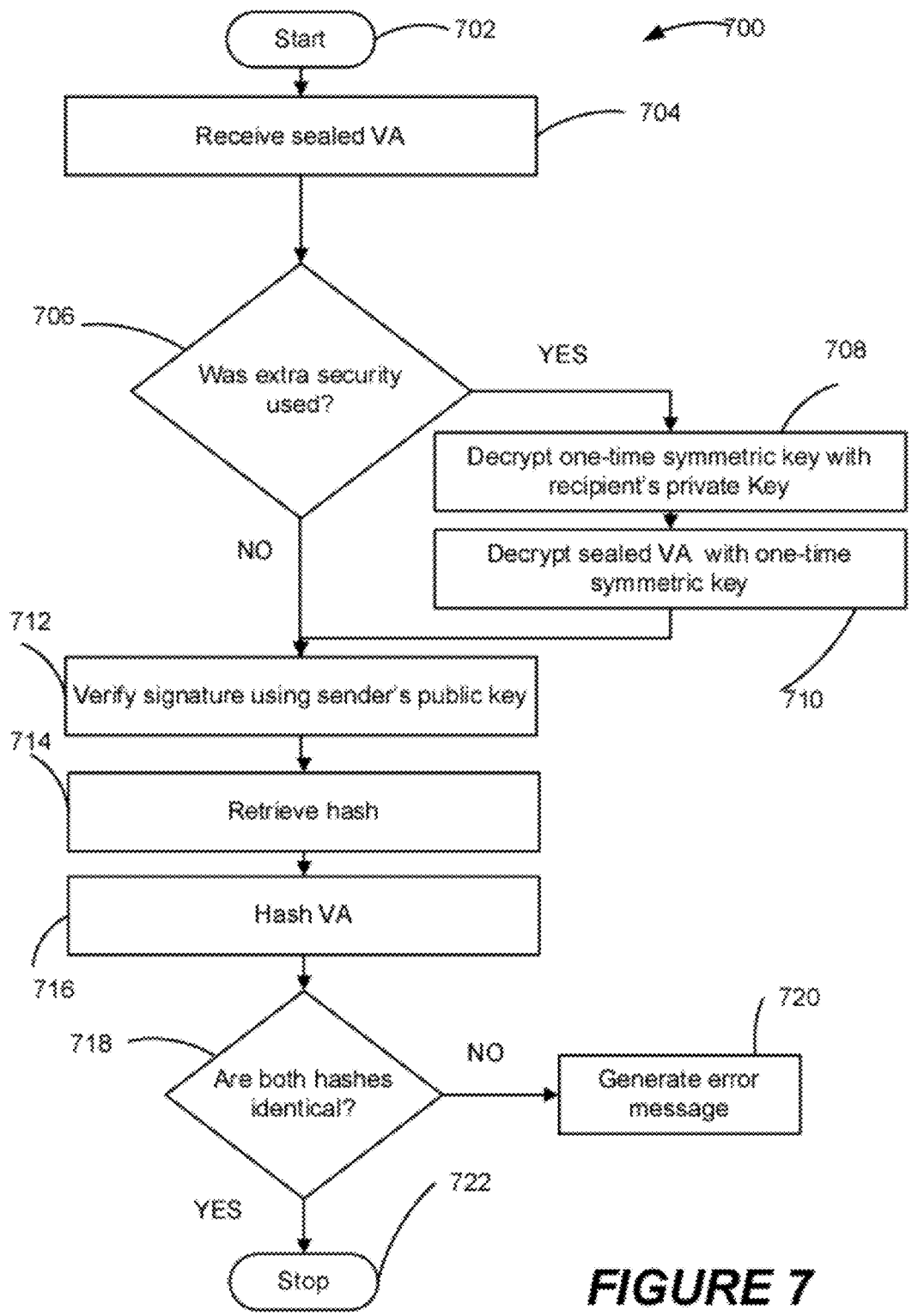
FIG. 7 shows a flowchart illustrating the step 556 "Perform Verification of VA" of FIG. 5(b)

The step "Perform Verification of the VA" (box 556) of procedure 550 presented in FIG. 5(b) is explained further with the help flowchart 700 presented in FIG. 7. This operation is typically performed when a recipient has received a signed VA, and wants to verify its authenticity and integrity before use. Upon Start (box 702), a sealed VA 10 is received (box 704). The procedure 700 checks to see if extra security was used (box 706). If so, the procedure 700 exits 'YES' from box 706, and decrypts the one-time symmetric key using the recipient's private key (box 708). The signed VA 10 available in the form of a VMDK file for example, is then decrypted with the symmetric key (box 710). The procedure 700 authenticates the signature by using vendor's public key (box 712) and retrieves the hash for VA 10 (box 714). The procedure 700 determines the hash of the VA 10 (box 716) and compares the hash with the data retrieved in the previous step (box 718). If they do not match, the procedure exits 'NO' from box 718, generates an error message indicating that the integrity is compromised (box 720) and exits (box 722). If they match, the recipient can be assured that the VA 10 has not been compromised, and it can continue to execute the VA 10; thus, the procedure exits 'YES' from box 718, and exits (box 722). If no extra security was used the procedure 700 exits 'NO' from box 706, and goes directly to the input of box 712.

Figure 8:
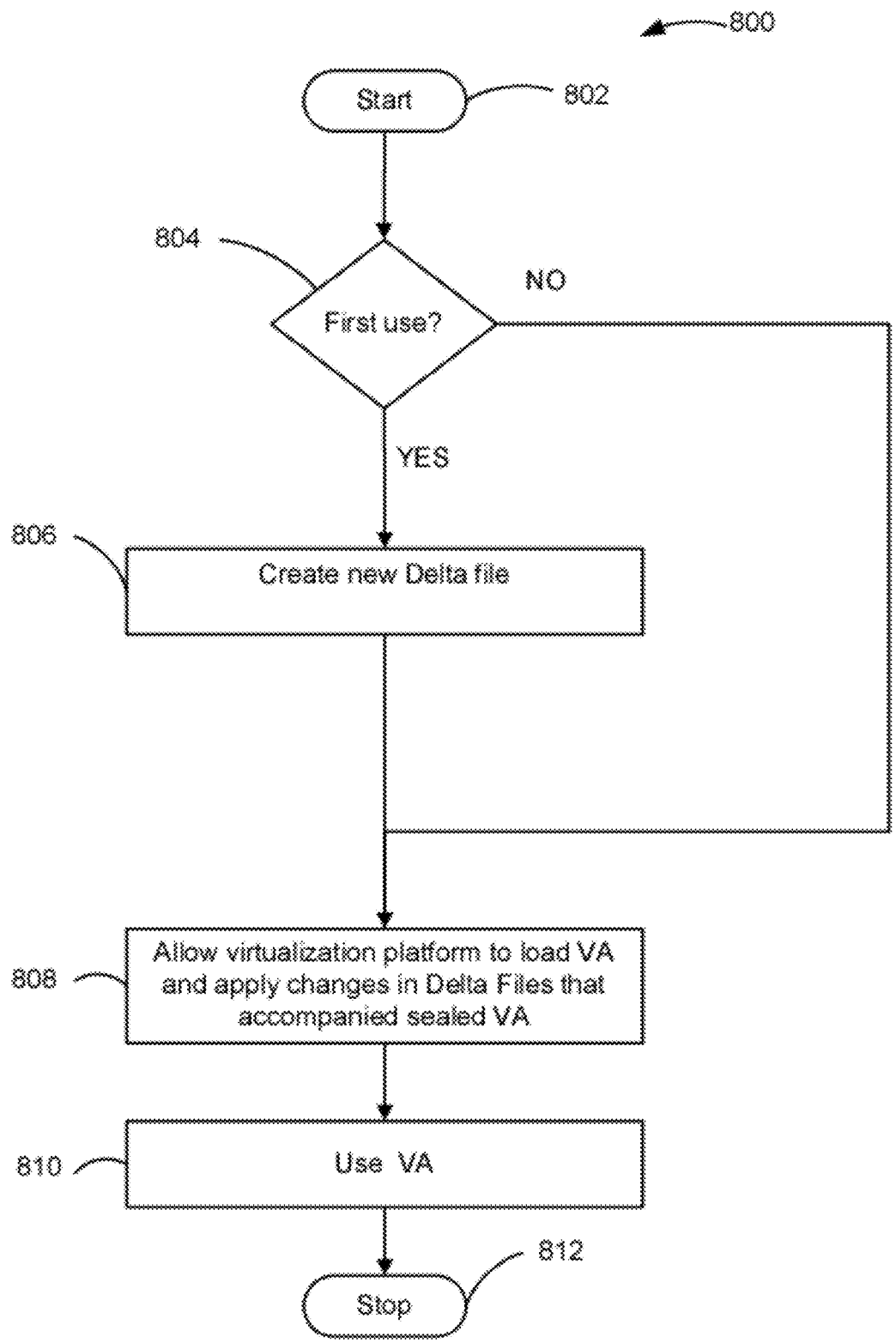
FIG. 8 shows a flowchart illustrating the step 558 "Execute VA" of FIG. 5(b)

The step "Execute VA and manage its execution" (box 558) of procedure 550 presented in FIG. 5(b) is explained further with the help of flowchart 800 presented in FIG. 8. Upon start (box 802), the procedure 800 verifies if this is first use of the VA 10 (box 804). If this is the first use, the procedure 800 exits 'YES' from box 804 and creates a new Delta file 20 (box 806) to record the changes made to the VA during execution on the recipient computer, keeping the original VA 10 intact. This is followed by allowing the Virtualization platform to load the VA 10 and apply the Delta files 20 (box 808). The procedure 800 then allows the user/recipient to use the VA 10 (box 810) and exits (box 812). If the VA 10 has been used before, the procedure 800 exits NO from box 804, and goes directly to the entry of box 808.

Figure 9:
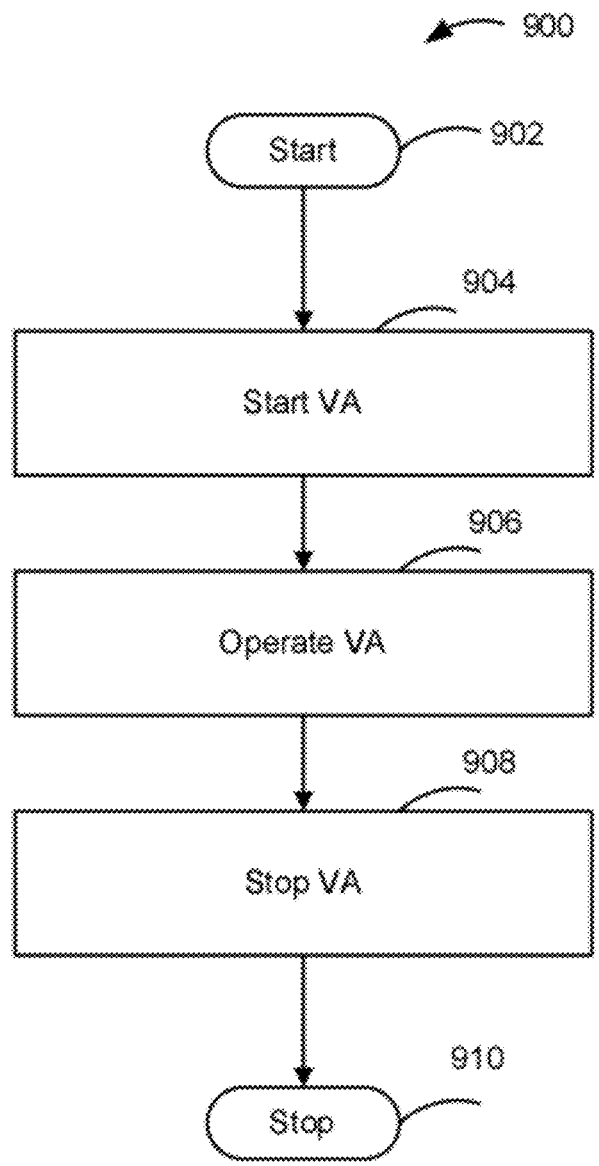
FIG. 9 shows a flowchart illustrating the step 810 "Use VA" of FIG. 8.

The step "Use VA" (box 810) of FIG. 8 is explained with the help of flowchart 900 presented in FIG. 9. Upon start (box 902), the procedure 900 starts the VA 10 (box 904) upon receiving a start command. The desired operations on the VA 10 are performed next (box 906). After completing these operations the procedure 900 stops the VA 10 (box 908) upon receiving a stop command and exits (box 910).

Figure 10:
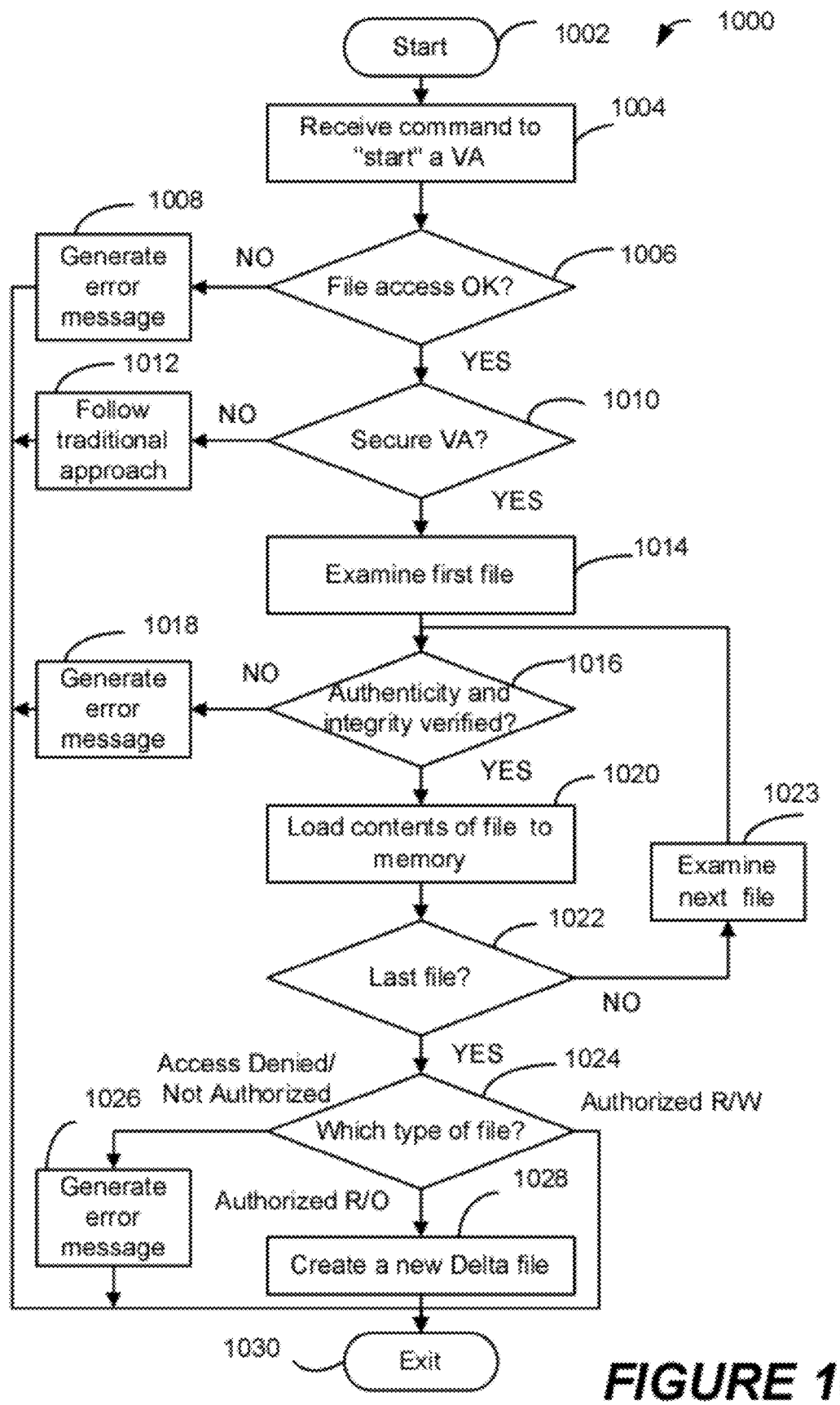
FIG. 10 shows a flowchart illustrating the step of the method "Start VA"

The step "start VA" is explained with the help of flowchart 1000 presented in FIG. 10. Upon start (box 1002), procedure 1000 receives a command to start a VA 10 (box 1004) from the Management Interface to Virtual Services 306. Whether access to the file is all right is checked next (box 1006). If not, the procedure 1000 exits 'NO' from box 1006, generates an error message (box 1008) and exits (box 1030). Otherwise, the procedure 1000 exits 'YES' from box 1006 and checks whether or not the VA 10 to be started is a secure VA 10 (box 1010). If not, the procedure 1000 exits 'NO' from box 1010, proceeds to follow a traditional approach for starting the virtual appliance (box 1012) and exits (box 1030). Otherwise, the first file in the VA is examined (box 1014) and the procedure 1000 checks the authenticity and integrity of the file (box 1016). If the file fails the test, the procedure 1000 exits 'NO' from box 1016, generates an error message (box 1018) and exits (box 1030). Otherwise, the contents of the file are loaded into memory (box 1020) and whether or not this was the last file in the VA is checked (box 1022). If not, the procedure 1000 exits 'NO' from box 1022, examines the next file in the VA (box 1023) and loops back to the entry of box 1016. Otherwise, the procedure 1000 checks the type of the last file (box 1024). For a file that the user is not authorized to use and the access to which is denied, the procedure 1000 exits 'Access Denied/Not Authorized' from box 1024, generates an error message (box 1026) and exits (box 1030). For a read-only file type, the procedure 1000 exits 'Authorized r/o' from box 1024, creates a new Delta file 20 (box 1028) for recording changes during execution of the VA on the recipient computer and exits (box 1030). For a read and write file type, a new Delta file 20 is not required and the procedure 1000 exits 'Authorized r/w' from box 1024 and exits (box 1030).

Figure 11:
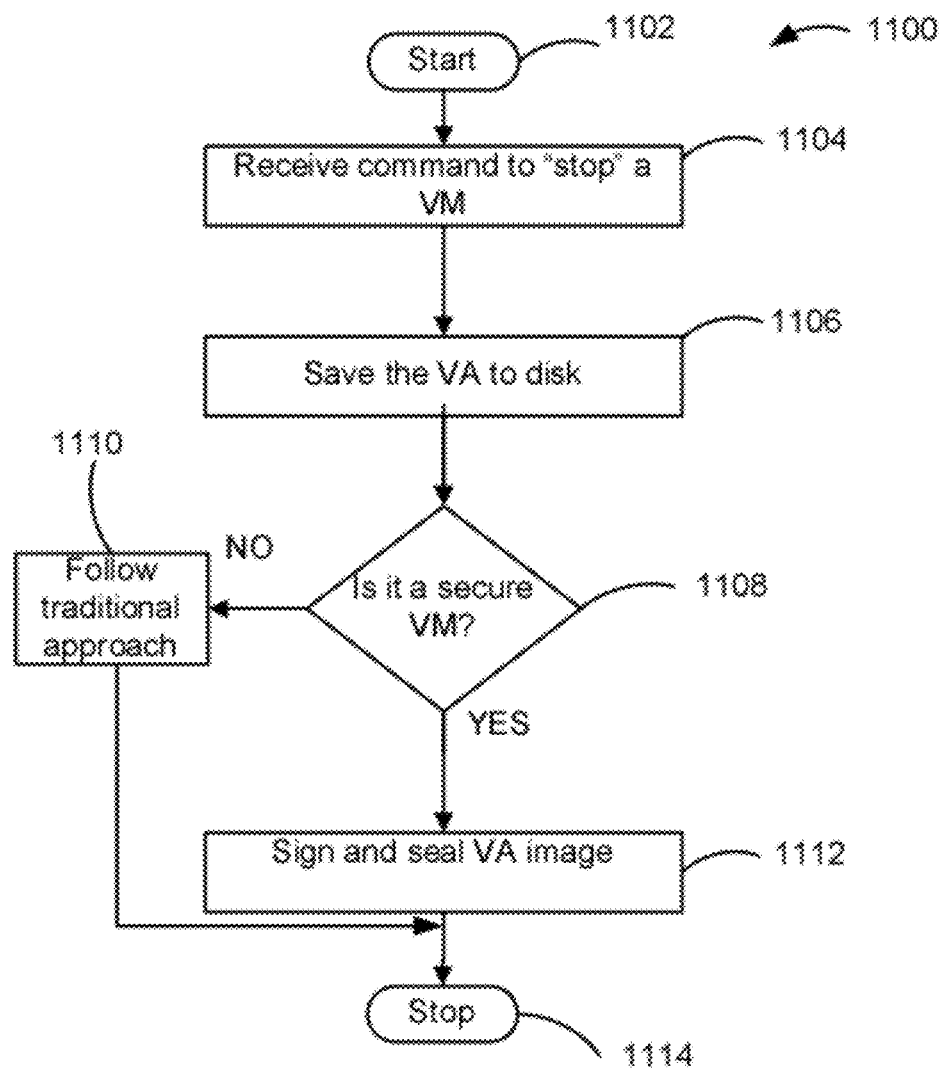
FIG. 11 shows a flowchart illustrating the step of the method "Stop VA"

The step "Stop VA" is explained with the help of flowchart 1100 displayed in FIG. 11. Upon start (box 1102) the procedure receives the command for stopping the VA 10 (box 1104) from the Management Interface to Virtual Services 306. The VA is then saved on the disk (box 1106) and the procedure 1100 checks whether or not this is a secure VA (box 1108). If not, the procedure 1100 exits 'NO' from box 1108, proceeds to follow the traditional approach for stopping the execution of the virtual appliance (box 1110) and exits (box 1114). Otherwise, the procedure 1100 exits 'YES' from box 1108, signs and seals the VA image (box 1112) and exits (box 1114). In this way, if a new Delta file 20 was created it remains protected. Please note that protecting the new Delta file 20 is required when the owner requires additional security or the VA 10 is being shipped to another enterprise or back to the vendor for root cause analysis.

So, for clarity, let us walk through a few examples to illustrate the loading of a secure VM image 303, and saving a VM image to storage 301d. A new secure VM image 303 (we will refer to it in this text as "WebServer" for ease of reading), received from a third-party vendor, is deployed to a virtualization system and the command to start the "WebServer" is received by the VMM through the Management Interface to Virtual Services 306. The "WebServer" VM is signed by the sender with its private key.

The VMM 305 will request to load the secure VM image 303 through the Security and management unit 15. The Security and management unit verifies the authenticity and integrity of this secure VM image 303 and passes it as "authorized r/o". The VMM 305 loads the "WebServer" into memory, creates and associates a Delta file 20 and starts the "WebServer".

At this point, the secure VM image 303 operates in the same manner as an unsecured VM (e.g. VM image 302) with the ability to transform through normal operations or by patching. When the Management Interface to Virtual Services 306 passes the stop command across, VMM 305 needs to ensure that the secure VM image 303 is still secure—along with its associated Delta files 20. The VMM 305 will request that the Security and Management unit 15 sign and seal the VM image 303 including all its associated Delta files 20 that are written to the disk.

The exact implementation of the Security and Management unit 15 within the architecture depends on the virtualization technology being used. As the requests are based on file accesses to load a secure VM image 303, it is simplest to implement it as a read-thru module between the VMM 305 and the physical storage device 301d, thereby abstracting the verification, encryption and decryption system from the VMM 305.

Now that we have a secure VM image 303 and a method of using it, the rights are applied to the secure VM image 303. The "rights" being granted to the secure VM image 303 are stored within a digital certificate, the same digital certificate that is used to verify the authenticity of the signature. Policies usually pertain to ownership issues—how to limit the use in copying, running, transferring. These policies are applied to the secure VM image 303 as described above.

A secure VM image 303 can contain any operating system and any number of applications including applications that can hold sensitive systems. The digital certificate can contain metadata and policy information, in a standards-based policy description language, that is enforced at the Policy Enforcement module 228. An integrated Policy Enforcement module and the Security Enforcement module 218 that are close to the VMM 305 ensure a seamless enforcement without gaps in security.

To present an example, an enterprise wants to ensure that the system 300 with its sensitive information is only loaded up on a specific virtualization host and only by specific individuals. Not only can the secure VM image 303 be secured with a certificate to lock it down to a specific system, but User Credentials can be specified as a requirement as well in the policy. So, in this example, the policy is set to require verification of a User Certificate for employee Bob. If Alice wanted to start this secure VM, the Security Enforcement module 218 would verify authenticity and integrity as described above, but then challenge the user for credentials. Unable to provide Bob's credentials, Alice is denied access to that secure VM image 303. Even if the secure VM image 303 is removed from the enterprise by a malicious user, the certificates around the secure VM image 303 envelopes the sensitive data within the secure VM 703, keeping it encrypted for all but authorized users.

So now we have a secured VM image 303, and can apply regular authorization polices. Virtualization offers some interesting capabilities that are applicable to VMs—the ability to clone a VM, for instance, allows a copy of the VM to be created. A policy can be created to ensure that for each authorized VM, there is only one instance within the entire virtualization environment. This still leaves room for the movement of this VM from one host to another or for disaster recovery scenarios while still keeping the usage to a single instance.

A policy could also be created to ensure that the configuration of the secure VM image 303 is limited in how it can be altered. For example, network interface cards (NICs) are virtualized and can be attached/detached and reattached at any time. A policy can ensure that only a set number of NICs are attached and that they cannot be detached or reconfigured. This would be presented either to trigger a violation at the Policy Enforcement module 228 that would correct the changes or as a denial of the action within the Management Interface to Virtual Services 306—the latter being the preferred method.

Now that the secure VM image 303, including its associated Delta files 20, is secured, and the rights applied to that VM are being enforced, chain of custody and change management will be considered. When a VA 10 is transferred from one owner/user to another, it is imperative that the chain of custody is maintained. The current owner/user must be able to authenticate and verify the integrity of each and every piece of a VA 10—the original package and each Delta file 20 that, based on rights and policies, is allowed to be transferred with the VA. This mechanism will present the pedigree of any particular VA 10 in the computer system.

A new series of rights can be applied to this VA 10 allowing or disallowing an end-user from using portions of the VA 10 without other portions. For example, an end-user can receive a VA 10 with a policy that allows the user to use the original VA 10 and the Delta files 20 so long as they are all applied and cannot revert to the original VA. Another policy can be set to allow the user to use the VA 10 with or without applying the Delta files 20. This would allow the transference and use of the original VA 10 (rights permitting) as well as with the Delta files 20 applied depending on the needs of this end-user.

Thus, chain of custody is built each and every time a Delta file 20 is created. The signature protecting the secure VM image 303 provides credentials as to the owner of that VM (or Delta file 20). As such, the Security and Management unit 15 can recreate the chain of custody and list each and every owner along the chain.

Change management is an attractive feature of the present invention and is supported by the sealed environment. Because the Delta files 20 (containing changes) move with the sealed VA, any one on any computer who has rights to the sealed VA 10 can figure out which changes were done by who and when.

Change management is a hot topic these days and no less so that around virtual machines and virtual appliances. When a sealed VA 10 is started for the first time, a Delta file 20 is created ensuring that no changes occur to the original VA, but are recorded within the Delta file 20. The Delta file 20 can be examined to present the differences between it and the original VA 10 presenting a list of changed items. To this end, Delta files 20 can be created throughout the lifecycle of a VA, especially when critical updates are applied to control and minimize the change applied to any particular Delta file 20. Other tools in virtualization can be used to combine the changes contained in Delta files 20 once the changes within each Delta files 20 are tested and considered approved.

Figure 12:
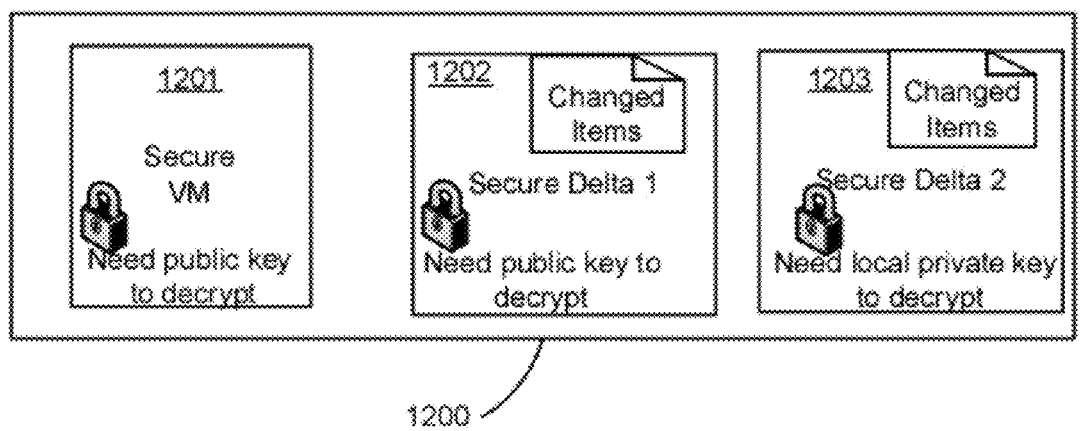
FIG. 12 illustrates change management for secure virtual machines.

What happens if the customer/user wants to take an original VA, add/modify the application or data held within the VA 10 (within the limits of rights policies) and then transfer this new VA 10 to another customer/end-user is discussed next. As with the original VA, each and every Delta file 20 can be signed as well offering assurances to the recipient that the Delta file 20 came from the originating party and that it has not been tampered with. This process is schematically illustrated in FIG. 12. Secure Delta1, 1202 is a Delta file 20 that came with original Secure VM 1201. When the user opens the sealed virtual appliance 1200 of FIG. 12, a new Delta file 20, Secure Delta2, 1203 is created. If this Delta file 20 is to be protected, it would be done using private keys within the company that is operating on the virtual appliance 1200. Thus, when changes are being made to the secure VMs, they happen in the last Delta file 20—the one being used by the final user. Those changes can be tracked in real-time, if desired, but it is also necessary to track the changes that occurred to the previous components of the secure VM image 303, meaning the original VM and all Delta files 20 preceding the final Delta files 20.

A VM can be backed up in its entirety as a raw file image or backed up on a file by file basis. When we have two of these raw file images, a few things can be done to them to look for differences, but for the purpose of this discussion the main item we are interested in is a file by file comparison.

Each raw file image is mounted to a forensics system in a read-only manner to gain access to the content in the virtual hard disk drive without tampering with the contents. Then an application module makes a file list from the older raw file image including details on the file names, sizes, hashes, access times, last user id, etc and then creates a similar list for the newer raw file image. The differences between the two lists are then captured giving a first order view of the changed items that occurred on the newer image. For a more detailed comparison of the changed items, each file identified in the difference list can be compared "byte for byte" whether it is a text or binary file, and the differences can be collected.

For a sealed VM 10, Change Management is handled as described above. In particular, calling for the changed items would have the virtualization system mount the secure VM image 303 (assuming that it was authorized by the Security Enforcement module) in a read-only state and the same VM with Delta files 20 applied up to the point of interest would also be mounted in a read-only state. At this point both file systems can be traversed to changes made at each Delta file 20 (like a checkpoint). As an enhancement, the changes can be attached to the digital certificate as a first order view to simplify retrieval by future users with the digital certificate protecting this first order view from tampering as well.

Information gathered through the techniques of change management can be stored as metadata in the Metadata module 234 and in turn used by the Policy Enforcement module 228 or queried by external components.

Thus, an integrated method and system for securing and managing virtual appliances, including tracking and controlling of VAs, have been provided.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect. For example, instead of sealing the VA 10 in its entirety, each and every file in the VA 10 can be sealed separately. For any object that was read-only, the file is already signed and sealed on the storage device 301d. For any object that was marked as read-write, the Security and Management Unit 15 can calculate the hash of it and sign it with a private key thereby allowing each component to be stored in a secure manner. It may also be possible to group related virtual appliances and secure and manage the group as a single unit.

Although the embodiments of the invention have been described in detail, it will be apparent to one skilled in the art that variations and modifications to the embodiment may be made within the scope of the following claims.

What is claimed is:

1. A secured virtual machine apparatus, comprising:
at least one hardware processor; and
at least one hardware memory device, having computer readable instructions stored thereon for execution by the at least one hardware processor, forming:
a virtual machine, comprising a virtual hard disk, containing an operating system and software applications running on the virtual hard disk; and
a security and management module, comprising:
a sealing module, sealing with the virtual machine, a signature of a sender, and policies governing ownership and execution of the virtual machine, to generate a secured virtual machine at a sender computer;
a security enforcement module, verifying authenticity of the sender upon receiving the secured virtual machine at a recipient computer; and
an execution management module, retrieving the virtual machine and the policies from the secured virtual machine, and managing the execution of the virtual machine on the recipient computer in accordance with the policies.

2. The secured virtual machine apparatus of claim 1, the computer readable instructions further forming another module, recording changes made to the virtual machine on the sender computer before the virtual machine has been sealed.

3. The secured virtual machine apparatus of claim 2, wherein the sealing module is further configured to seal the changes together with the virtual machine, the signature and the policies to generate the secured virtual machine.

4. The secured virtual machine apparatus of claim 1, the computer readable instructions further forming yet another module, recording changes made to the virtual machine on the recipient computer.

5. The secured virtual machine apparatus of claim 1, the computer readable instructions further forming a metadata module, comprising metadata related to resource requirement data and runtime data for the virtual machine.

6. The secured virtual machine apparatus of claim 1, wherein the execution management module further comprises a rules engine, processing rules describing the policies.

7. The secured virtual machine apparatus of claim 1, the computer readable instructions further forming an encryption module for encrypting the secured virtual machine at the sender computer, and a decryption module, decrypting the secured virtual machine at the recipient computer.

8. The secured virtual machine apparatus of claim 1, wherein the sealing module further comprises:
a hash generation module, creating a hash of contents of a file containing the virtual machine; and
a signature generation module, encrypting the hash with a private key of the recipient.

9. The secured virtual machine apparatus of claim 8, wherein the signature generation module further comprises an encryption module, encrypting the secured virtual machine with a key, and further encrypting the key with a public key of the recipient.

10. The secured virtual machine apparatus of claim 1, wherein the security enforcement module further comprises:
a signature verification module, verifying the signature of the sender; and
a hash verification module, determining a hash of contents of the file containing the virtual machine at the recipient computer, and comparing it with a hash of contents of a file containing the virtual machine at the sender computer.

11. A computer system, comprising:
a hardware platform, comprising at least one central processing unit, and at least one memory device;
the at least one hardware memory device, having computer readable instructions stored thereon for execution by the at least one central processing unit, forming:
a hypervisor having a virtual machine manager, managing one or more virtual machines, each virtual machine, comprising a virtual hard disk, containing an operating system and software applications running on the virtual hard disk;

at least one of the virtual machines being configured as a secured virtual machine by causing the at least one central processing unit to:

to generate a secured virtual machine at a sender computer, including sealing with a virtual machine, a signature of a sender, and policies governing ownership and execution of the virtual machine;

verify authenticity of the sender upon receiving the secured virtual machine at a recipient computer; and retrieve, from the secured virtual machine, the virtual machine and the policies, and manage the execution of the virtual machine on the recipient computer in accordance with the policies.

12. The computer system of claim 11, wherein the computer readable instructions further cause the at least one central processing unit to record changes made to the virtual machine on the sender computer before the virtual machine has been sealed, and to seal the changes together with the virtual machine, the signature and the policies to generate the secured virtual machine.

13. The computer system of claim 11, wherein the computer readable instructions further cause the at least one central processing unit to record changes made to the virtual machine on the recipient computer.

14. The computer system of claim 11, wherein the computer readable instructions further cause the at least one central processing unit to encrypt the secured virtual machine at the sender computer, and to decrypt the encrypted secured virtual machine at the recipient computer.

15. The computer system of claim 11, wherein the computer readable instructions further cause the at least one central processing unit to:

create a hash of contents of a file containing the virtual machine; and encrypt the hash with a private key of the recipient.

16. The computer system of claim 15, wherein the computer readable instructions further cause the at least one central processing unit to encrypt the secured virtual machine with a key, and further encrypt the key with a public key of the recipient.

17. The computer system of claim 11, wherein the computer readable instructions further cause the at least one central processing unit to:

verify the signature of the sender; and determine a hash of contents of the file containing the virtual machine at the recipient computer, and comparing it with a hash of contents of a file containing the virtual machine at the sender computer.

18. The computer system of claim 11, wherein the computer readable instructions further cause the at least one central processing unit to form a rules engine, processing rules describing the policies.

19. The computer system of claim 11, the computer readable instructions further forming a metadata module, comprising metadata related to resource requirement data and runtime data for the virtual machine.

20. A system for generating a secured virtual machine, the system comprising:

a sender computer, comprising:

a first processor; and a first memory device, having computer readable instructions stored thereon for execution by the first processor, causing the first processor to generate the secured virtual machine, comprising sealing with a virtual machine, a signature of a sender, and policies governing ownership and execution of the virtual machine; and a recipient computer, comprising:

a second processor; and a second memory device, having computer readable instructions stored thereon for execution by the second processor, causing the second processor to:

verify authenticity of the sender upon receiving the secured virtual machine at a recipient computer; and retrieve the virtual machine and the policies from the secured virtual machine, and manage the execution of the virtual machine on the recipient computer in accordance with the policies.

* * * * *